United States Patent
Melkote et al.

(10) Patent No.: US 6,819,518 B1
(45) Date of Patent: Nov. 16, 2004

(54) METHOD AND APPARATUS FOR SELF SERVOWRITING OF TRACKS OF A DISK DRIVE USING A SERVO CONTROL LOOP HAVING A TWO-DIMENSIONAL DIGITAL STATE COMPENSATOR

(75) Inventors: Hemant Melkote, San Jose, CA (US); Robert L. Cloke, Santa Clara, CA (US); Vinay K. Agarwal, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 230 days.

(21) Appl. No.: 10/280,603

(22) Filed: Oct. 24, 2002

(51) Int. Cl.[7] .............................................. G11B 21/02
(52) U.S. Cl. ....................................................... 360/75
(58) Field of Search ............................. 360/75, 77.02, 360/77.03, 77.04

(56) References Cited

U.S. PATENT DOCUMENTS

| | | |
|---|---|---|
| 4,536,809 A | 8/1985 | Sidman |
| 5,448,429 A | 9/1995 | Cribbs et al. |
| 5,541,784 A | 7/1996 | Cribbs et al. |
| 5,576,909 A * | 11/1996 | Dierkes et al. .......... 360/78.09 |
| 5,907,447 A | 5/1999 | Yarmchuck et al. |

* cited by examiner

*Primary Examiner*—Sinh Tran
*Assistant Examiner*—Mitchell Slavitt
(74) *Attorney, Agent, or Firm*—Milad G. Shara, Esq.; Robroy R. Fawcett, Esq.

(57) ABSTRACT

A method is disclosed for defining tracks on a rotating magnetic disk medium of a disk drive. Reference tracks are followed using a servo control loop while writing servo burst patterns defining a first target servo track. The servo control loop includes a two-dimensional digital state compensator having a first input that receives position error signals, a first output that generates control signals for positioning a transducer head, a second output that generates track-following state variables, and a second input that receives stored track-following state variables. The first target track is followed using the servo control loop while servo burst patterns are written, and while the stored track-following state variables corresponding to the servo burst patterns defining the first target track are applied to the second input.

24 Claims, 7 Drawing Sheets

IDEAL SERVO TRACKS

FIG. 5B

WRITTEN SERVO TRACKS

METHOD AND APPARATUS FOR SELF SERVOWRITING OF TRACKS OF A DISK DRIVE USING A SERVO CONTROL LOOP HAVING A TWO-DIMENSIONAL DIGITAL STATE COMPENSATOR

BACKGROUND OF THE INVENTION

1. Field of the Invention

The present invention relates to magnetic disk drives, and more particularly, to self servowriting of tracks on a rotating magnetic disk medium.

2. Description of the Prior Art

The writing of servotrack information on a magnetic disk medium is a critical process in the manufacture of a disk drive. Conventionally, servotrack information is written with a specialized servowriting instrument mounted on a large granite block to minimize external vibration effects. Increasing track densities and decreasing disk-drive size has led to the investigation of self servowriting techniques. One issue confronting the use of self servowriting is track-to-track or radial error propagation and amplification of written-in errors and imperfections with respect to a perfectly circular track.

U.S. Pat. No. 5,907,447 to Yarmchuk et al. describes reduction of radial error propagation by generating a correction signal using a filter applied to a position error signal (PES) to reduce a closed-loop response of a track-following servo loop to less than unity at frequencies equal to integer multiples of the disk rotation frequency. While permitting implementation of self servowriting with reduced radial error propagation, the PES filtering technique of the Yarmchuk patent fails to readily support increasingly aggressive track densities.

Accordingly, there exists a need for technique for aggressively reducing written-in error propagation during self servowriting. The present invention satisfies these needs.

SUMMARY OF THE INVENTION

The present invention may be embodied in a method, implemented in a magnetic disk drive, for writing servo burst patterns for tracks on a rotating magnetic disk medium. In the method, a first reference track, defined by previously written servo burst patterns, is followed using a servo control loop while writing servo burst patterns at a first target radial location on the magnetic disk medium. The servo control loop has a closed-loop response and includes a two-dimensional digital state compensator having first and second inputs and first and second outputs. The first input receives position error signals and the first output generates control signals for positioning a transducer head with respect to the selected track during track following. The second output generates track-following state variables during track following, and the second input receives combined track-following state variables. Accordingly, the track-following state variables generated at the second output during the writing of the servo burst patterns on the first target radial location are stored. A second reference track, defined by previously written servo burst patterns, is followed using the servo control loop while writing servo burst patterns at a second target radial location. The track-following state variables generated at the second output during the writing of the servo burst patterns at the second target radial location are stored. A third reference track, defined by the previously written servo burst patterns at the first and second radial target locations, is followed using the servo control loop while writing servo burst patterns at a third target radial location. The stored track-following state variables generated at the second output during writing of the servo burst patterns at the first and second target radial locations are combined, and the combined track following state variables are applied to the second input during writing of the servo burst patterns at the third target radial location.

In more detailed features of the invention, the dimensions of the two-dimensional digital state compensator may be circumferential position and radial position. The first reference track may be offset from the second reference track by more than one servo track, and the third reference track may be offset from the second reference track by at least one servo track. Each radial location may be offset from the corresponding reference track by at least one servo track.

Further, the compensator may be defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t) \quad (1)$$

$$u_k(t)[\begin{matrix} C_{11} & C_{12} \end{matrix}] \begin{bmatrix} \hat{x}_k(t) \\ \hat{y}_k(t) \end{bmatrix}$$

where k is the reference track number, t is a servo wedge number or time;

$u_k(t)$ is the control signals for positioning the transducer head, $x_k(t)$ is a state vector in a first dimension or time, $\hat{y}_k(t)$ is the combined track-following state variables, in a second dimension or track number, $\hat{y}_k(t)$ is the track-following state variables generated during writing of the servo burst patterns, $e_k(t)$ is the position error signals (PES), and $A_{11}$, $A_{12}$, $A_{21}$, $A_{22}$, $B_{11}$, $B_{21}$, $C_{11}$, $C_{12}$ are matrices of appropriate dimensions.

Alternatively, the compensator may be defined (in observer based form) by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t)) \quad (2)$$

$$\hat{e}_k(t) = [-C_g \ 1] \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where k is the reference track number;

t is a servo wedge number or time;

$e_k(t)$ is the position error signals (PES), $\hat{e}_k(t)$ is an estimate of the PES, $(A_g, B_g, C_g)$ is a state space description of a head disk assembly, $u_k(t)$ is the control signals for positioning the transducer head $x_k(t)$ is a state vector in the first dimension or time, $\hat{y}_k(t)$ is the combined track-following state variable, in a second dimension or track number, $\hat{y}_{k+1}(t)$ is the track-following state variables generated during writing of the servo burst patterns, $K_e$ is an estimator gain, and $K_c$ is a compensator gain.

In an alternative embodiment of the invention, a reference track, defined by previously formed servo burst patterns on the magnetic disk medium, is followed using a servo control loop while forming servo burst patterns defining a first target track. The servo loop has a closed-loop response and includes a two-dimensional digital state compensator having first and second inputs and first and second outputs. The first input receives position error signals (PES) and the first output generates control signals for positioning a transducer head with respect to the selected track during track following. The second output generates track-following state variables during track following, and the second input receives stored track-following state variables. Accordingly, the track-following state variables generated at the second output while forming the servo burst patterns defining the first target track are stored. The first target track is followed using the servo control loop while forming servo burst patterns defining a second target track. While forming the servo burst patterns defining the second target track, the stored track-following state variables generated at the second output while forming the servo burst patterns defining the first target track are applied to the second input.

In more detailed features of the invention, the dimensions of the two-dimensional digital state compensator may be circumferential position and radial position. The first target track may be offset from the reference track by one servo track, and the second target track may be offset from the first target track by one servo track. Alternatively, the first target track may be offset from the reference track by more than one servo track, and the second target track may be offset from the first target track by more than one servo track.

Further, the compensator may be defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t) \quad (3)$$

$$u_k(t)[C_{11} \quad C_{12}] \begin{bmatrix} \hat{x}_k(t) \\ \hat{y}_k(t) \end{bmatrix}$$

where k is the track number;

t is a servo wedge number or time;

$u_k(t)$ is the control signals for positioning the transducer head, $x_k(t)$ is a state vector in a first dimension or time, $\hat{y}_k(t)$ is the stored track-following state variables, in a second dimension or track number, $\hat{y}_{k+1}(t)$ is the track-following state variables that are stored while forming the servo burst patterns, $e_k(t)$ is the position error signals (PES), and $A_{11}$, $A_{12}$, $A_{21}$, $A_{22}$, $B_{11}$, $B_{21}$, $C_{11}$, $C_{12}$ are matrices of appropriate dimensions.

Alternatively, the compensator may be defined (in observer-based form) by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t)) \quad (4)$$

$$\hat{e}_k(t) = [-C_g \quad 1] \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where k is the track number;

t is a servo wedge number or time;

$e_k(t)$ is the position error signals (PES), $\hat{e}_k(t)$ is an estimate of the PES, ($A_g$, $B_g$, $C_g$) is a state space description of a head disk assembly, $u_k(t)$ is the control signals for positioning the transducer head $x_k(t)$ is a state vector in the first dimension or time, $\hat{y}_k(t)$ is the track-following state variable, in a second dimension or track number, $\hat{y}_{k+1}(t)$ is the track-following state variables that are stored while forming the servo burst patterns, $K_e$ is an estimator gain, and $K_c$ is a compensator gain.

BRIEF DESCRIPTION OF THE DRAWINGS

The accompanying drawings illustrate embodiments of the present invention and, together with the description, serve to explain the principles of the invention.

DETAILED DESCRIPTION

With reference to FIGS. 1 through 4, the present invention may be embodied in a method 100 (FIG. 1), implemented in a magnetic disk drive 30 (FIG. 3), for writing servo burst patterns, A, B, C and D (FIG. 4), for servo tracks 12 on a rotating magnetic disk medium. In the method, a first reference track N+1, defined by previously written servo burst patterns, C and D, is followed using a servo control loop 24 (FIG. 2) while writing servo burst patterns A at a first target radial location coincident with yet to be defined servo track N+3 (step 112). The servo loop has a closed-loop response and includes a two-dimensional digital state compensator 26 having first and second inputs, $I_1$ and $I_2$, and first and second outputs, $O_1$ and $O_2$. The first input receives position error signals (PES) and the first output generates control signals $u_k(t)$ for positioning a transducer head 42 with respect to the selected track during track following. The second output generates track-following state variables $\hat{y}_{k+1}(t)$ during track following, and the second input receives combined track-following state variables $\hat{y}_k(t)$. Accordingly, the track-following state variables generated at the second output during the writing of the servo burst patterns on the first target radial location are stored (step 114) in, for example, a table 28. A second reference track N+3, defined by previously written servo burst patterns, C and D, is followed using the servo control loop while writing servo burst patterns B at a second target radial location coincident with the yet to be defined servo track N+5 (step 116). The track-following state variable generated at the second output during writing of the servo burst patterns at the second target radial location are stored (step 118). A third reference track N+4, defined by the previously written servo burst patterns, A and B, at the first and second radial target locations, is followed using the servo control loop while writing servo burst patterns D at a third target radial location coincident with the yet to be defined servo track N+6 (step 120). The stored track-following state variables generated at the second output during writing of the servo burst patterns at the first and second target radial locations are combined, and the combined track following stale variables are applied to the second input during writing of the servo burst patterns at the third target radial location.

Figure 4:
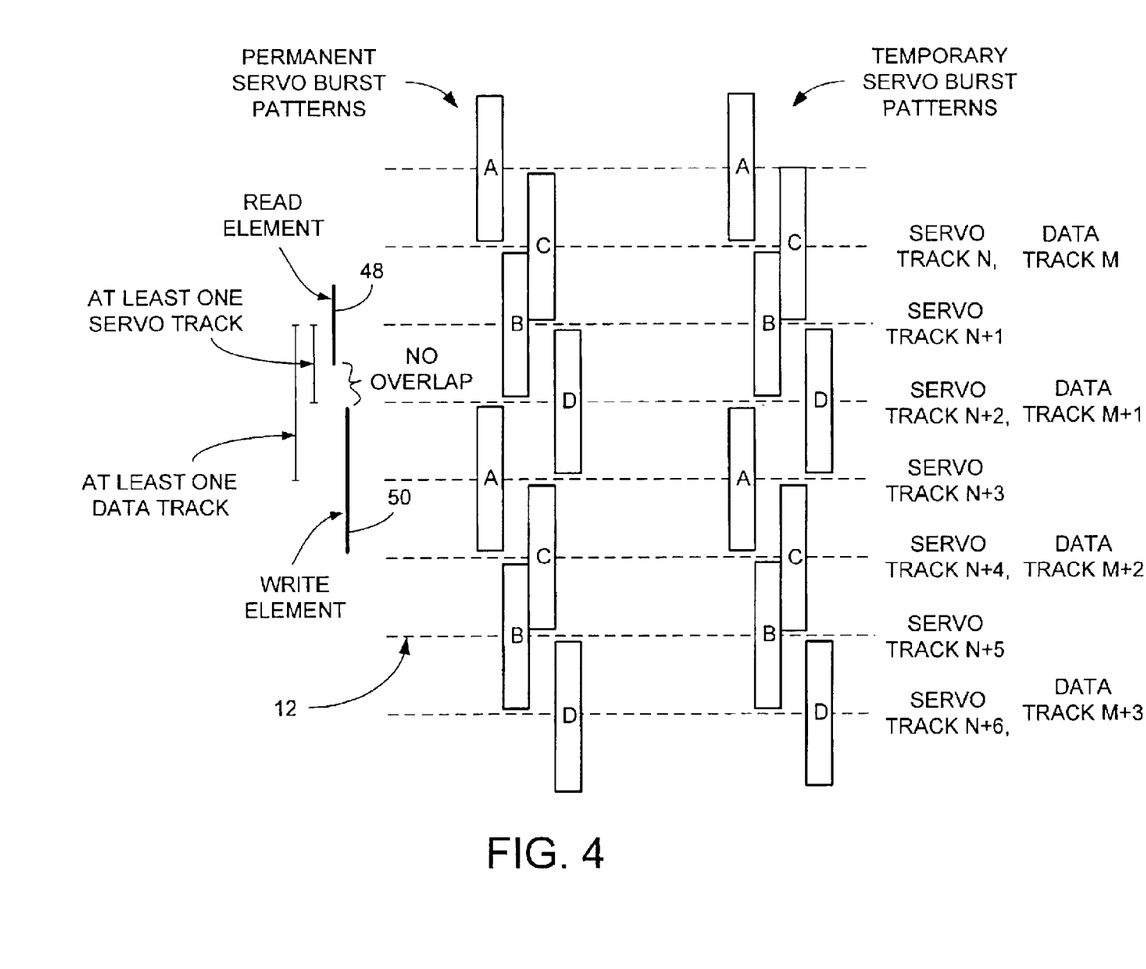
FIG. 4 is a schematic diagram illustrating a transducer head, having non-overlapping read and write elements offset by at least two servo tracks, for self-servo writing write-element-width servo bursts for defining servo tracks, according to the first embodiment of the present invention.

Advantageously, seed servo burst patterns, A, B, C and D, for initially defining servo tracks 12, N and N+1, are written using a technique for forming as near perfect circular track path as practical. Also, interleaved permanent and temporary servo burst patterns may be used to address timing and sensor element cross-talk issues. Accordingly, the permanent servo burst patterns may be used for track following while the temporary servo burst patterns are written, and the temporary servo burst patterns may be used for track following while the permanent servo burst patterns are written. After servo tracks are written across the entire disk surface, the temporary servo burst patterns would then revert to data sectors of the corresponding data tracks and eventually would be overwritten by user data. Also, while not explicitly described above, the servo burst patterns C centered on servo track N+4 may be written as a seed track or may be written by track following along, for example, servo track N+2.

When writing servo burst patterns at a target radial location, the PES from a reference track 12 is created by reading at least two servo burst pattern edges from, for example, patterns A and B that define the track N+4. Each of these patterns has associated with it a retrieved stored state variable $\hat{y}_k$, say $\hat{y}_k^A$ and $\hat{y}_k^B$. The effective stored state variable to be inputted to the two-dimensional compensator with writing servo burst patterns on the target track is a linear combination of the two stored state variables, i.e., $\hat{y}_k = f(\hat{y}_k^A, \hat{y}_k^B)$. The state output of the compensator will then be stored with reference to the presently-written servo burst pattern on the target radial location. The coefficients of the linear combination of stored state variables will generally be proportional to the magnitudes of the servo burst pattern elements, in this example A and B, although modifications to this rule may be made to accommodate or correct for such imperfections such as PES linearity of the read element.

Figure 1:
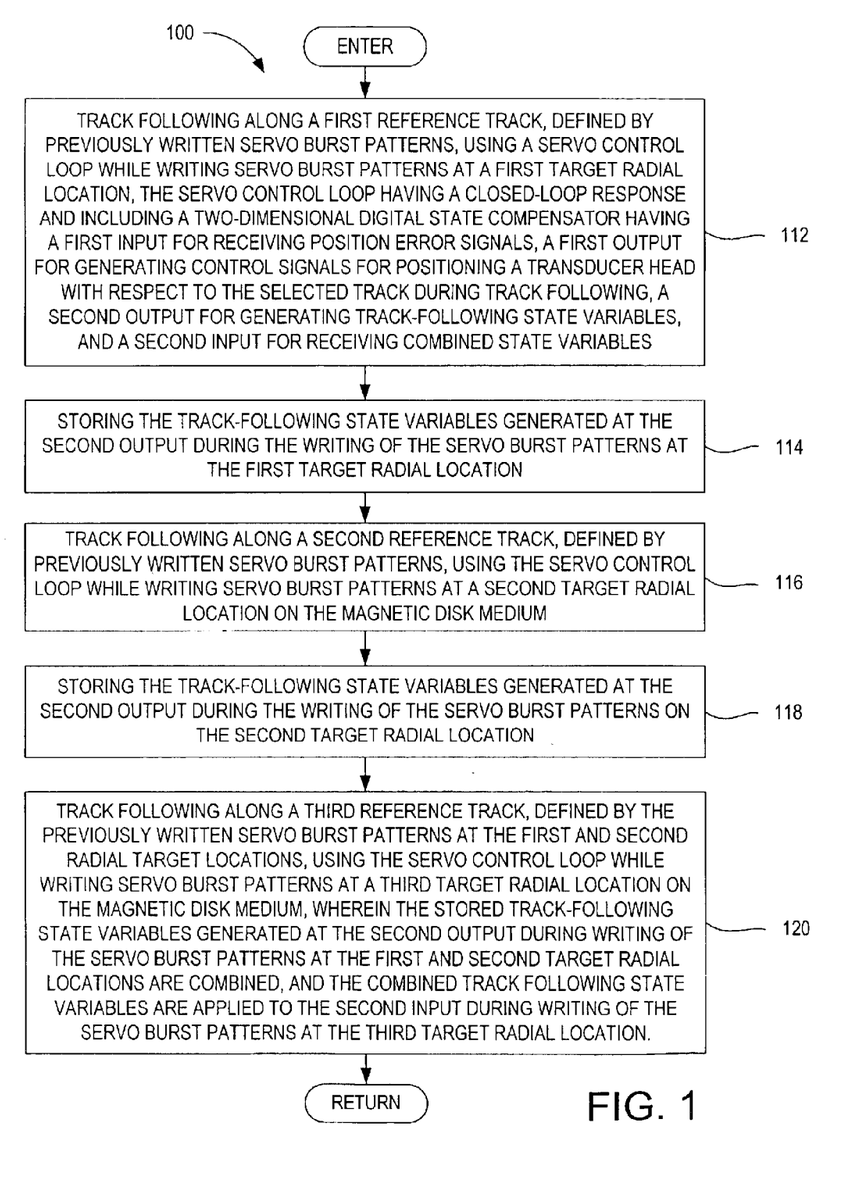
FIG. 1 is a flow chart illustrating a first embodiment of a self servo-writing method for defining tracks on a rotating magnetic disk medium of a disk drive, using a track-following servo-control loop having a two-dimensional digital state compensator, according to the present invention.
Figure 2:
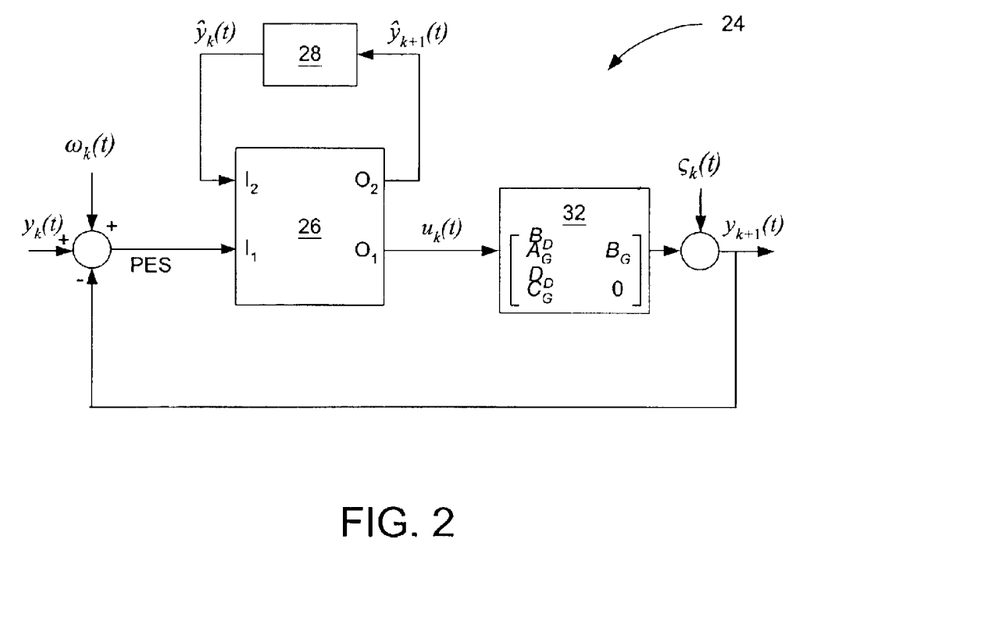
FIG. 2 is a block diagram of the track-following servo control loop.

The dimensions of the two-dimensional digital state compensator 26 may be circumferential position or time t, and radial position or track number k. The first reference track N+1 may be offset from the second reference track N+3 by more than one servo track, and the third reference track N+4 may be offset from the second reference track by at least one servo track. Each radial location may be offset from the corresponding reference track by at least one servo track.

The disk drive 30 (FIG. 3) has a head disk assembly (HDA) 32 and a sampled servo controller 34. The HDA includes a rotating magnetic disk 36 having, after servo writing, distributed position information in a plurality of uniformly spaced-apart servo wedges 38, a rotary actuator 40 that pivots relative to a base and that carries a transducer head 42 that periodically reads the position information from the servo wedges, and a voice coil motor (VCM) circuit 44 that includes a voice coil motor coupled to the rotary actuator and that responds to a control effort signal 46. The sampled servo controller periodically adjusts the control effort signal during a track-following operation based on the position information. Advantageously, the transducer head has a read element 48 and an offset write element 50 (FIG. 4). Generally, the write element is wider than the read element. The center of the read element may be spaced from a nearest edge of the write element by at least one servo track such that the elements do not overlap.

Figure 5A:
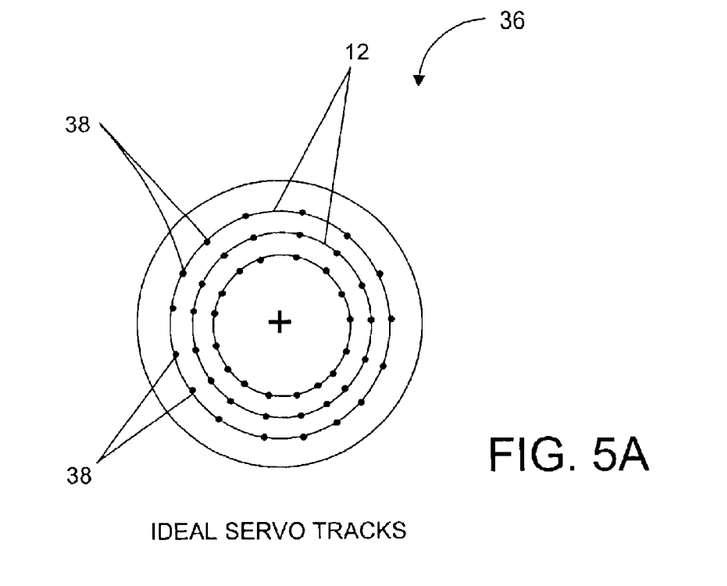
FIG. 5A is a schematic diagram illustrating ideal servo tracks on a disk of a disk drive.
Figure 5B:
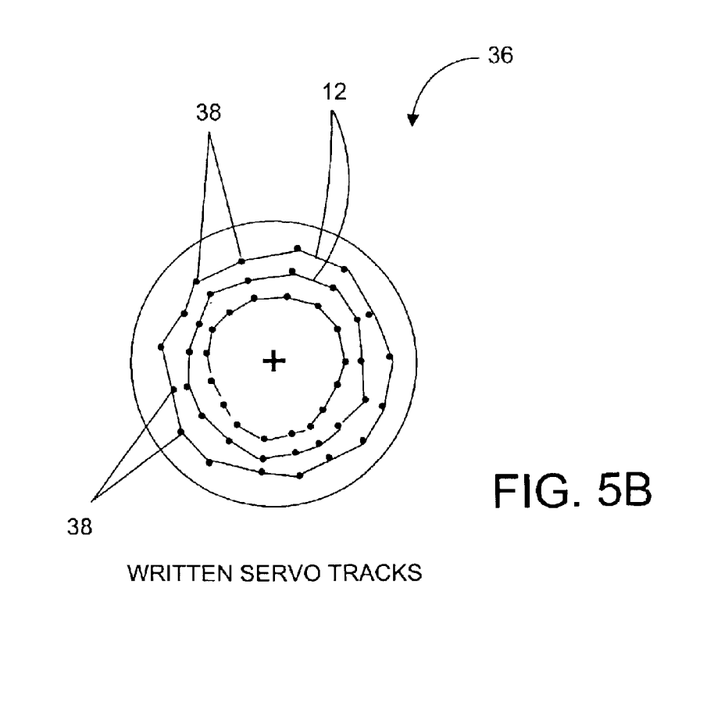
FIG. 5B is a schematic diagram illustrating written servo tracks exhibiting imperfections.

An ideal servo track 12 is one that forms a perfect circle on the disk 36, as shown in FIG. 5A. During manufacture, servo information for the embedded servo wedges 38 is placed on the disk during the self servowriting operation. The servo information includes the servo burst patterns having edges that are placed at locations that deviate outwardly or inwardly from the ideal "center line" of the servo track circle as shown in FIG. 5B. These apparent deviations from the ideal servo track center line can occur due to spindle runout, vibrations or movements, during servo writing operation, and media defects or noise in the region of the servo burst patterns.

Figure 3:
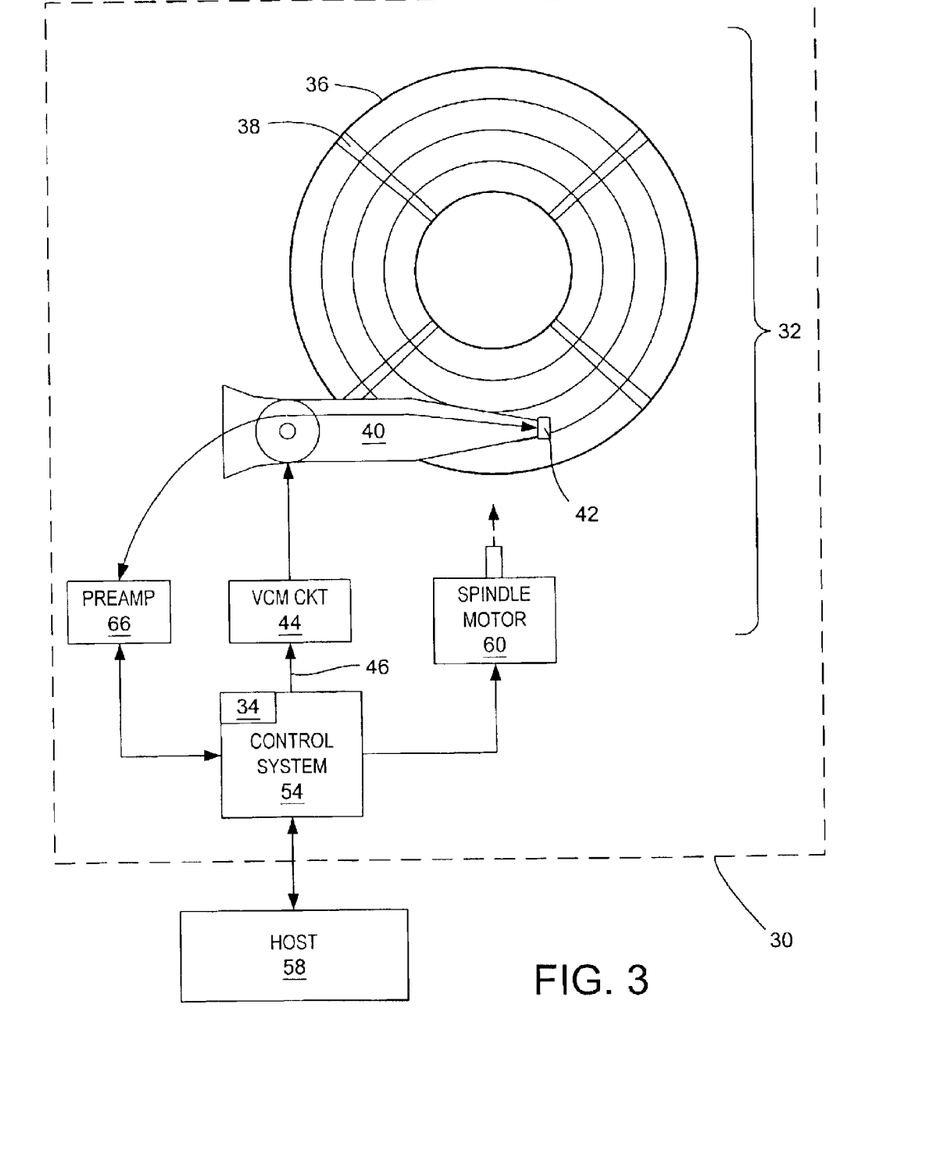
FIG. 3 is a block diagram of a disk drive coupled to a host for implementing the determining method of FIG. 1.

The disk drive 30 further includes a control system 54, and the HDA 32 further includes a spindle motor 60 and a preamplifier 66. The control system includes the sampled servo controller 34, and circuitry and processors that control the HDA and that provide an intelligent interface between a host 58 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor.

The data tracks on the media surface may be divided into the storage segments. Each storage segment may begin with a sector of the servo wedges 38 which is followed by data sectors. The data sectors may include data blocks, each generally storing 512 data bytes. Each data block may be addressed using a logical block address (LBA).

The servo control loop 24 (FIG. 2) includes the HDA 32 after the track-following compensator 26. Disturbances $\varsigma_k$ to the HDA alter the resulting head position $y_{k+1}$. A track selection signal $y_k$ is compared to the bead position $y_{k+1}$ to generate the PES. When a track 12 is defined, the data (one number per servo wedge) from the second output $O_2$ of the compensator 26 is stored in the lookup table 28 and used as the second input $I_2$ to the compensator when the next track is defined. This process is repeated for defining all of the tracks during the self servowriting process. A state-space model for the HDA 32 is given by $$x_k^g(t+1) = A_g x_k^g(t) + B_g u_k(t)$$
$$y_{k+1}(t) = C_g x_k^g(t) + \varsigma_k(t) \qquad (5)$$

with $\varsigma_k$ being the output disturbance. The PES output is given by $$e_k(t) = [-C_g \quad 1]\begin{bmatrix} x_k^g \\ y_k \end{bmatrix} + [-1 \quad 1]\begin{bmatrix} \zeta_k \\ \omega_k \end{bmatrix} \quad (6)$$

where $\omega_k$ is the head sensor noise.

A two-dimensional observer-based compensator 26 for the system is given by $$\begin{bmatrix} \hat{x}_k(t+1) \\ \hat{y}_{k+1}(t) \end{bmatrix} = \begin{bmatrix} A_g & 0 \\ C_g & 0 \end{bmatrix}\begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t)) \quad (7)$$

$$\hat{e}_k(t) = [-C_g \quad 1]\begin{bmatrix} \hat{x}_k(t) \\ \hat{y}_k(t) \end{bmatrix}$$

with $$u_k(t) = K_c \begin{bmatrix} \hat{x}_k(t) \\ \hat{y}_k(t) \end{bmatrix} \quad (8)$$

where $K_c$ is the compensator gain, and $K_e$ is an estimator gain. Let $$K_e = \begin{bmatrix} K_e^1 \\ K_e^2 \end{bmatrix}; K_c = [K_c^1 \quad K_c^2] \quad (9)$$

Substituting for $\hat{e}_k(t)$ and $u_k(t)$ gives the observer-based controller in output feedback form:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix}\begin{bmatrix} \hat{x}_k(t) \\ \hat{y}_k(t) \end{bmatrix} + \begin{bmatrix} B_g \\ 0 \end{bmatrix}[K_c^1 \quad K_c^2]\begin{bmatrix} \hat{x}_k(t) \\ \hat{y}_k(t) \end{bmatrix} + \quad (10)$$

$$K_c e_k(t) - \begin{bmatrix} K_e^1 \\ K_e^2 \end{bmatrix}[-C_g \quad 1]\begin{bmatrix} \hat{x}_k(t) \\ \hat{y}_k(t) \end{bmatrix}$$

$$= \begin{bmatrix} A_g + B_g K_c^1 + K_c^1 C_g & B_g K_r^2 - K_e^1 \\ C_g + K_e^2 C_g & -K_e^2 \end{bmatrix}\begin{bmatrix} \hat{x}_k(t) \\ \hat{y}_k(t) \end{bmatrix} +$$

$$K_c e_k(t)$$

$$u_k(t) = [K_c^1 \quad K_c^2]\begin{bmatrix} \hat{x}_k(t) \\ \hat{y}_k(t) \end{bmatrix}$$

Equation 10 is of the same form as equation 1, and the matrices $A_{11}$, $A_{12}$, $A_{21}$, $A_{22}$, $B_{11}$, $B_{21}$, $C_{11}$, $C_{12}$ of equation 1 may be obtained by comparison.

The closed-loop system is formed by grouping the "x" and "y" states of the HDA 32 and compensator 26 together. Denoting $$\bar{x}_k = \begin{bmatrix} x_k^g \\ \hat{x}_k \end{bmatrix}, \quad (11)$$

$$\bar{y}_k = \begin{bmatrix} y_k \\ \hat{y}_k \end{bmatrix}$$

the closed loop system is given by $$\begin{bmatrix} \bar{x}_k(t+1) \\ \bar{y}_{k+1}(t) \end{bmatrix} = \bar{A}\begin{bmatrix} \bar{x}_k(t) \\ \bar{y}_k(t) \end{bmatrix} + \bar{B}w_k(t) \quad (12)$$

where $$\bar{A} = \begin{bmatrix} A_g & B_g K_c^1 & 0 & B_g K_c^2 \\ -K_e^1 C_g & A_g + B_g K_c^1 + K_e^1 C_g & K_e^1 & B_g K_c^2 - K_e^1 \\ C_g & 0 & 0 & 0 \\ -K_e^2 C_g & C_g + K_e^2 C_g & K_e^2 & -K_e^2 \end{bmatrix} \quad (13)$$

Partition the matrix into 4 block matrices given by $$\bar{A}_{11} = \begin{bmatrix} A_g & B_g K_c^1 \\ -K_e^1 C_g & A_g + B_g K_c^1 + K_e^1 C_g \end{bmatrix} \quad (14)$$

$$\bar{A}_{12} = \begin{bmatrix} 0 & B_g K_c^2 \\ K_e^1 & B_g K_c^2 - K_e^1 \end{bmatrix}$$

$$\bar{A}_{21} = \begin{bmatrix} C_g & 0 \\ -K_e^2 C_g & C_g + K_e^2 C_g \end{bmatrix}$$

$$\bar{A}_{22} = \begin{bmatrix} 0 & 0 \\ K_e^2 & -K_e^2 \end{bmatrix}$$

A necessary and sufficient condition for stability along the pass in terms of a Lyapunov equation (See, Lemma 4.4.2, in E. Rogers & D. Owens, "Stability analysis of linear repetitive processes", Springer Verlag, Berlin 1992) is as follows: Suppose the pair $(\bar{A}_{11}, \bar{A}_{12})$ is observable and the pair $(\bar{A}_{11}, \bar{A}_{12})$ reachable. Then the system is stable along the pass if and only if there exist symmetric positive definite matrices $Q$, $W_1$, $W_2$, and $W$ with $$W = \begin{bmatrix} W_1 & 0 \\ 0 & W_2 \end{bmatrix} \quad (15)$$

such that $$\bar{A}'W\bar{A} - W = -Q \quad (16)$$

Such a condition may be verified using tools such as MATLAB.

Figure 6:
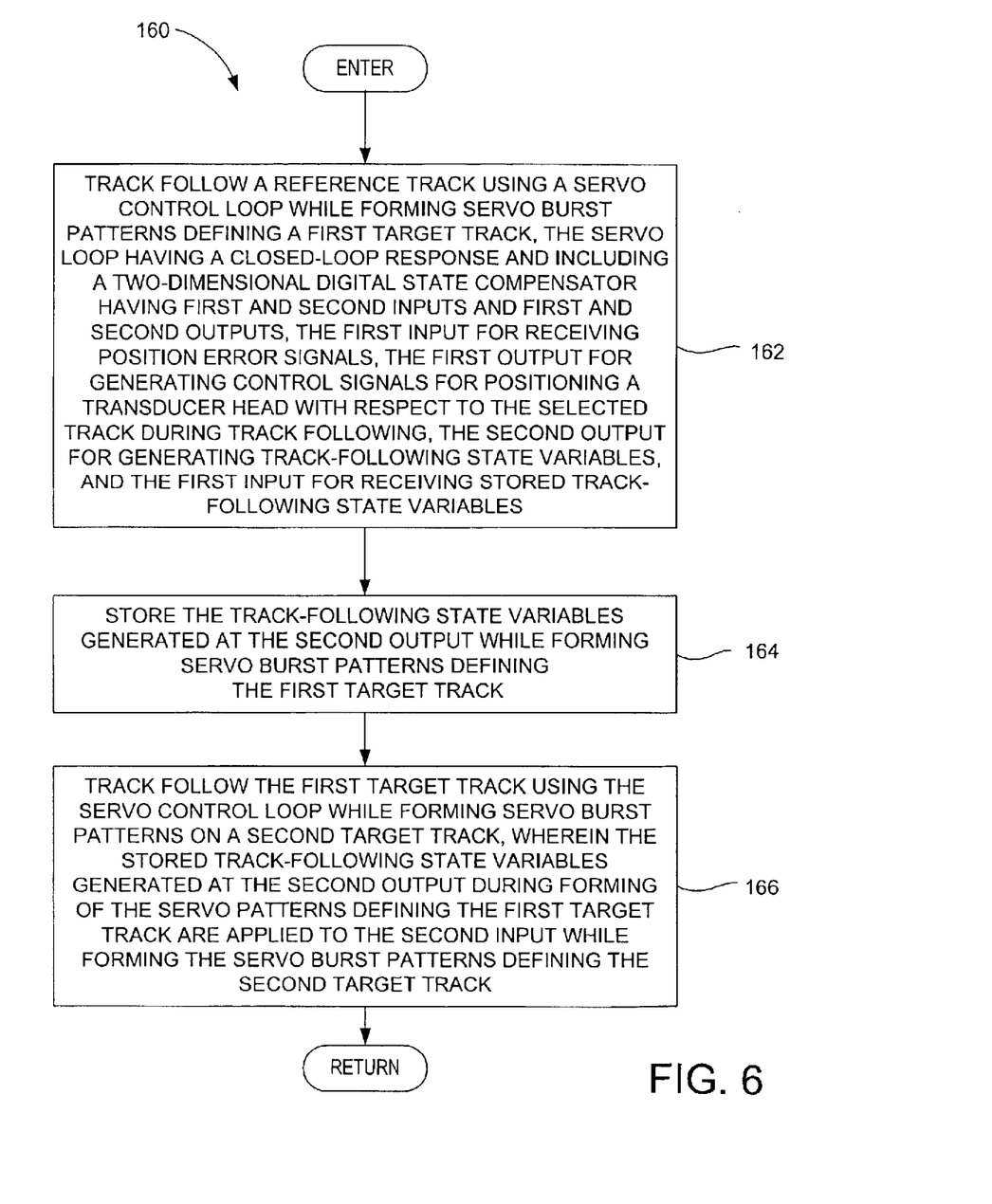
FIG. 6 is a flow chart illustrating a second embodiment of a self servo-writing method for defining tracks on a rotating magnetic disk medium of a disk drive, using a track-following servo-control loop having a two-dimensional digital state compensator, according to the present invention.
Figure 7:
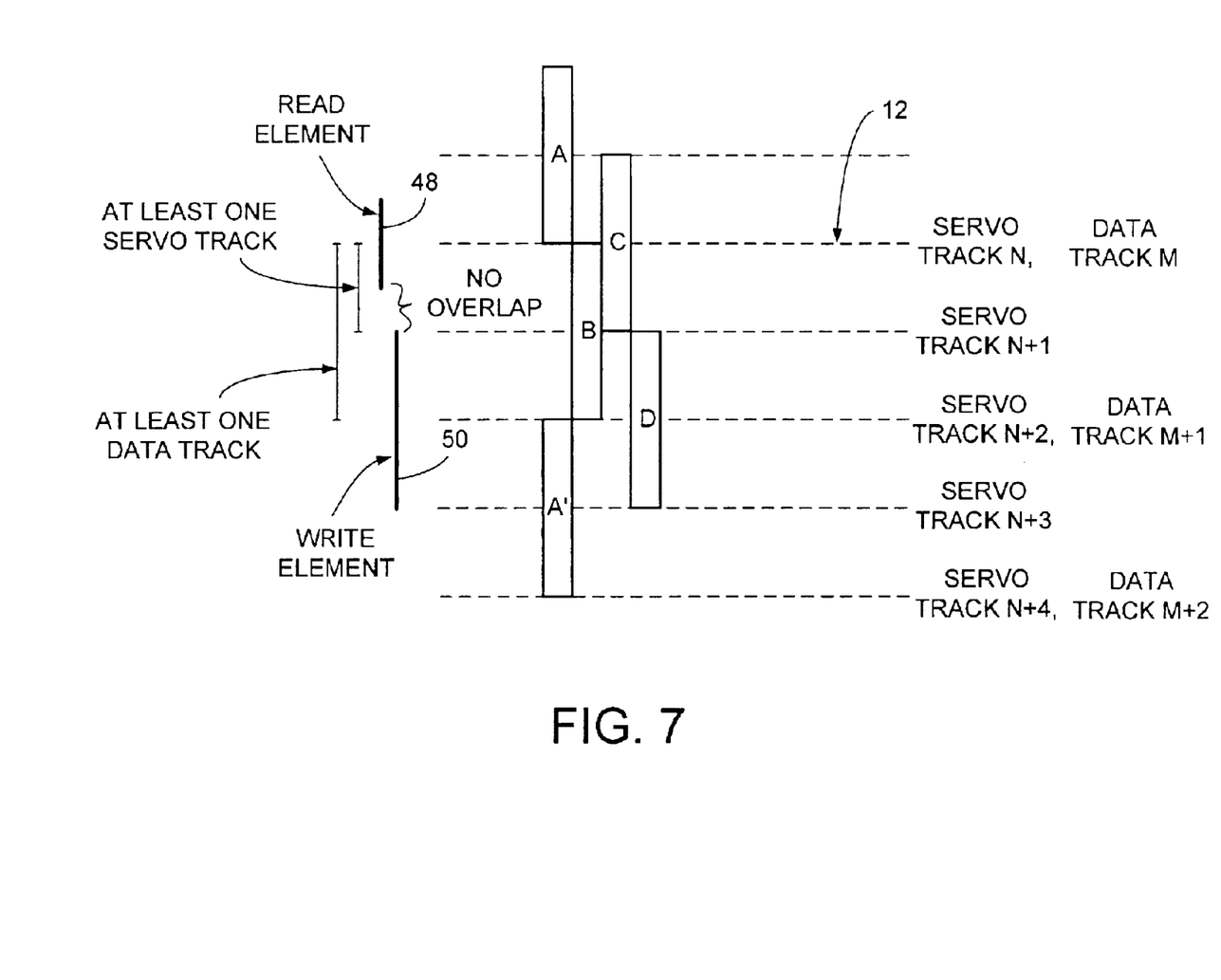
FIG. 7 is a schematic diagram illustrating a transducer head, having non-overlapping read and write elements offset by at least two servo tracks, for self-servo writing servo bursts for defining servo tracks, according to the second embodiment of the present invention.

With reference to FIGS. 6 and 7, the present invention may be embodied in a self servo-writing method 160 (FIG. 6), implemented in the magnetic disk drive 30 (FIG. 3), for defining servo tracks 12 (FIG. 7) on a rotating magnetic disk medium. In the method, a reference track N, defined by previously formed servo burst patterns, A and B, is track followed using a servo control loop 24 (FIG. 2) while forming servo burst patterns, C and D, defining a first target track N+1 (step 162). The servo control loop has a closed-loop response and includes a two-dimensional digital state compensator 26 having first and second inputs, $I_1$ and $I_2$, and first and second outputs, $O_1$ and $O_2$. The first input receives position error signals (PES) and the first output generates control signals $u_k(t)$ for positioning a transducer head 42 with respect to the selected track during track following. The second output generates track-following state variables $\hat{y}_{k+1}(t)$ during track following, and the second input receives stored track-following state variables $\hat{y}_k(t)$. Accordingly, the track-following state variables generated at the second output while forming the servo burst patterns defining the first target track are stored (step 164). The first target track is track followed using the servo control loop while servo burst patterns, A' and B, are formed defining a second target track N+2. While forming the servo burst patterns defining the second target track, the stored track-following state variables generated at the second output while forming the servo burst pattern defining the first target track are applied to the second input (step 166).

The first target track N+1 may be offset from the reference track N by one servo track, and the second target track N+2 may be offset from the first target track by one servo track. Alternatively, the tracks may be offset by more than one servo track.

Self servowriting techniques for forming the servo burst patterns to define the servo tracks is described in more detail in U.S. patent application Ser. No. 09/541,136, filed on Mar. 31, 2000, and titled SELF-SERVO WRITING A DISK DRIVE BY PROPAGATING INTERLEAVED SETS OF TIMING CLOCKS AND SERVO BURSTS DURING ALTERNATE TIME INTERVALS, which is incorporated herein by reference.

We claim:

1. A method for writing servo burst patterns for tracks on a rotating magnetic disk medium, comprising:

track following along a first reference track, defined by previously written servo burst patterns, using a servo control loop while writing servo burst patterns at a first target radial location on the magnetic disk medium, the servo control loop having a closed-loop response and including a two-dimensional digital state compensator having first and second inputs and first and second outputs, the first input for receiving position error signals, the first output for generating control signals for positioning a transducer head with respect to the selected track during track following, the second output for generating track-following state variables, and the second input for receiving combined track-following state variables;

storing the track-following state variables generated at the second output during the writing of the servo burst patterns at the first target radial location;

track following along a second reference track, defined by previously written servo burst patterns, using the servo control loop while writing servo burst patterns at a second target radial location on the magnetic disk medium;

storing the track-following state variables generated at the second output during the writing of the servo burst patterns on the second target radial location;

track following along a third reference track, defined by the previously written servo burst patterns at the first and second radial target locations, using the servo control loop while writing servo burst patterns at a third target radial location on the magnetic disk medium, wherein the stored track-following state variables generated at the second output during writing of the servo burst patterns at the first and second target radial locations are combined, and the combined track following state variables are applied to the second input during writing of the servo burst patterns at the third target radial location.

2. A method for writing servo burst patterns as defined in claim 1, wherein the dimensions of the two-dimensional digital state compensator are circumferential position and radial position.

3. A method for writing servo burst patterns as defined in claim 1, wherein the first reference track is offset from the second reference track by more than one servo track, and the third reference track is offset from the second reference track by at least one servo track.

4. A method for writing servo burst patterns as defined in claim 1, wherein each radial location is offset from the corresponding reference track by at least one servo track.

5. A method for writing servo burst patterns as defined in claim 1, wherein the compensator is defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t)$$

$$u_k(t) = \begin{bmatrix} C_{11} & C_{12} \end{bmatrix} \begin{bmatrix} \hat{x}_k(t) \\ \hat{y}_k(t) \end{bmatrix}$$

where k is the reference track number;

t is a servo wedge number or time;

$u_k(t)$ is the control signals for positioning the transducer head, $x_k(t)$ is a state vector in a first dimension or time, $\hat{y}_k(t)$ is the combined track-following state variables, in a second dimension or track number, $\hat{y}_{k+1}(t)$ is the track-following state variables generated during writing of the servo burst patterns, $e_k(t)$ is the position error signals (PES), and $A_{11}, A_{12}, A_{21}, A_{22}, B_{11}, B_{21}, C_{11}, C_{12}$ are matrices of appropriate dimensions.

6. A method for writing servo burst patterns as defined in claim 1, wherein the compensator is defined by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t))$$

$$\hat{e}_k(t) = \begin{bmatrix} -C_g & 1 \end{bmatrix} \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where k is the reference track number;

t is a servo wedge number or time;

$\hat{e}_k(t)$ is the position error signals (PES), $\hat{e}_k(t)$ is an estimate of the PES, $(A_g, B_g, C_g)$ is a state space description of a head disk assembly, $u_k(t)$ is the control signals for positioning the transducer head $x_k(t)$ is a state vector in the first dimension or time, $\hat{y}_k(t)$ is the combined track-following state variable, in a second dimension or track number, $\hat{y}_{k+1}(t)$ is the track-following state variables generated during writing of the servo burst patterns, $K_e$ is an estimator gain, and $K_c$ is a compensator gain.

7. Apparatus for writing servo burst patterns for tracks on a rotating magnetic disk medium, comprising:

means for track following along a first reference track, defined by previously written servo burst patterns, using a servo control loop while writing servo burst patterns on a first target track on the magnetic disk medium, the servo control loop having a closed-loop response and including a two-dimensional digital state compensator having first and second inputs and first and second outputs, the first input for receiving position error signals, the first output for generating control signals for positioning a transducer head with respect to the selected track during track following, the second output for generating track-following state variables, and the second input for receiving combined track-following state variables;

means for storing the track-following state variables generated at the second output during the writing of the servo burst patterns at the first target radial location;

means for track following along a second reference track, defined by previously written servo burst patterns, using the servo control loop while writing servo burst patterns at a second target radial location on the magnetic disk medium;

means for storing the track-following state variables generated at the second output during the writing of the servo burst patterns on the second target radial location;

means for track following along a third reference track defined by the previously written servo burst patterns at the first and second target radial locations using the servo control loop while writing servo burst patterns at a third target radial location on the magnetic disk medium, wherein the stored track-following state variables generated at the second output during writing of the servo burst pattern at the first and second target radial location are combined, and the combined track following state variables are applied to the second input during writing of the servo burst patterns at the third target radial location.

8. Apparatus for writing servo burst patterns as defined in claim 7, wherein the dimensions of the two-dimensional digital state compensator are circumferential position and radial position.

9. Apparatus for writing servo burst patterns as defined in claim 7, wherein the first reference track is offset from the second reference track by more than one servo track, and the third reference track is offset from the second reference track by at least one servo track.

10. Apparatus for writing servo burst patterns as defined in claim 7, wherein each radial location is offset from the corresponding reference track by at least one servo track.

11. Apparatus for writing servo burst patterns as defined in claim 7, wherein the compensator is defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t)$$

$$u_k(t) = \begin{bmatrix} C_{11} & C_{12} \end{bmatrix} \begin{bmatrix} \hat{x}_k(t) \\ \hat{y}_k(t) \end{bmatrix}$$

where k is the reference track number;

t is a servo wedge number or time;

$u_k(t)$ is the control signals for positioning the transducer head, $x_k(t)$ is a state vector in a first dimension or time, $\hat{y}_k(t)$ is the combined track-following state variables, in a second dimension or track number, $\hat{y}_{k+1}(t)$ is the track-following state variables generated during writing of the servo burst patterns, $e_k(t)$ is the positions error signals (PES), and $A_{11}$, $A_{12}$, $A_{21}$, $A_{22}$, $B_{11}$, $B_{21}$, $C_{11}$, $C_{12}$ are matrices of appropriate dimensions.

12. Apparatus for writing servo burst patterns as defined in claim 7, wherein the compensator is defined by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t))$$

$$\hat{e}_k(t) = \begin{bmatrix} -C_g & 1 \end{bmatrix} \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where k is the reference track number;

t is a servo wedge number or time;

$e_k(t)$ is the position error signals (PES), $\hat{e}_k(t)$ is an estimate of the PES, $(A_g, B_g, C_g)$ is a state space description of a head disk assembly, $u_k(t)$ is the control signals for positioning the transducer head $x_k(t)$ is a state vector in the first dimension or time, $\hat{y}_k(t)$ is the combined track-following state variables, in a second dimension or track number, $\hat{y}_{k+1}(t)$ is the track-following state variables generated during writing of the servo burst patterns, $K_e$ is an estimator gain, and $K_c$ is a compensator gain.

13. A method for defining tracks on a rotating magnetic disk medium, comprising:

track following along a reference track, defined by previously formed servo burst patterns on the magnetic disk medium, using a servo control loop while forming servo burst patterns defining a first target track, the servo control loop having a closed-loop response and including a two-dimensional digital state compensator having first and second inputs and first and second outputs, the first input for receiving position error signals, the first output for generating control signals for positioning a transducer head with respect to the selected track during track following, the second output for generating track-following state variables, and the second input for receiving stored track-following state variables;

storing the track-following state variables generated at the second output while forming the servo burst patterns defining the first target track;

track following along the first target track using the servo control loop while forming servo burst patterns defining a second target track, wherein the stored track-following state variables generated at the second output while forming the servo burst patterns defining the first target track are applied to the second input while forming the servo burst patterns defining the second target track.

14. A method for defining tracks as defined in claim 13, wherein the dimensions of the two-dimensional digital state compensator are circumferential position and radial position.

15. A method for defining tracks as defined in claim 13, wherein the first target track is offset from the reference track by one servo track, and the second target track is offset from the first target track by one servo track.

16. A method for defining tracks as defined in claim 13, wherein the first target track is offset from the reference track by more than one servo track, and the second target track is offset from the first target track by more than one servo track.

17. A method for defining tracks as defined in claim 13, wherein the compensator is defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t)$$

$$u_k(t) = \begin{bmatrix} C_{11} & C_{12} \end{bmatrix} \begin{bmatrix} \hat{x}_k(t) \\ \hat{y}_k(t) \end{bmatrix}$$

where k is the track number;

t is a servo wedge number or time;

$u_k(t)$ is the control signals for positioning the transducer head, $x_k(t)$ is a state vector in a first dimension or time, $\hat{y}_k(t)$ is the stored track-following state variables, in a second dimension or track number, $\hat{y}_{k+1}(t)$ is the track-following state variables that are stored while forming the servo burst patterns, $e_k(t)$ is the position error signals (PES), and $A_{11}, A_{12}, A_{21}, A_{21}, A_{22}, B_{11}, B_{21}, C_{11}, C_{12}$ are matrices of appropriate dimensions.

18. A method for defining tracks as defined in claim 13, wherein the compensator is defined by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t))$$

$$\hat{e}_k(t) = \begin{bmatrix} -C_g & 1 \end{bmatrix} \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where k is the track number;

t is a servo wedge number or time;

$e_k(t)$ is the position error signals (PES), $\hat{e}_k(t)$ is an estimate of the PES, $(A_g, B_g, C_g)$ is a state space description of a head disk assembly, $u_k(t)$ is the control signals for positioning the transducer head $x_k(t)$ is a state vector in the first dimension or time, $\hat{y}_k(t)$ is the stored track-following state variable, in a second dimension or track number, $\hat{y}_{k+1}(t)$ is the track-following state variables that are stored while forming the servo burst patterns, $K_e$ is an estimator gain, and $K_c$ is a compensator gain.

19. Apparatus for defining tracks on a rotating magnetic disk medium, comprising:

means for track following along a reference track, defined by previously formed servo burst patterns on the magnetic disk medium, using a servo control loop while forming servo burst patterns defining a first target track, the servo control loop having a closed-loop response and including a two-dimensional digital state compensator having first and second inputs and first and second outputs, the first input for receiving position error signals, the first output for generating control signals for positioning a transducer head with respect to the selected track during track following, the second output for generating track-following state variables, and the second input for receiving stored track-following state variables;

means for storing the track-following state variables generated at the second output while forming the servo burst patterns defining the first target track;

means for track following along the first target track using the servo control loop while forming servo burst patterns defining a second target track, wherein the stored track-following state variables generated at the second output while forming the servo burst patterns defining the first target track are applied to the second input while forming the servo burst patterns the second target track.

20. Apparatus for defining tracks as defined in claim 19, wherein the dimensions of the two-dimensional digital state compensator are circumferential position and radial position.

21. Apparatus for defining tracks as defined in claim 19, wherein the first target track is offset from the reference track by one servo track, and the second target track is offset from the first target track by one servo track.

22. Apparatus for defining tracks as defined in claim 19, wherein the first target track is offset from the reference track by more than one servo track, and the second target track is offset from the first target track by more than one servo track.

23. Apparatus for defining tracks as defined in claim 19, wherein the compensator is defined by the following equations:

$$\begin{bmatrix} \hat{x}_k(t+1) \\ \hat{y}_{k+1}(t) \end{bmatrix} = \begin{bmatrix} A_{11} & A_{12} \\ A_{21} & A_{22} \end{bmatrix} \begin{bmatrix} \hat{x}_k(t) \\ \hat{y}_k(t) \end{bmatrix} + \begin{bmatrix} B_{11} \\ B_{21} \end{bmatrix} e_k(t)$$

$$u_k(t) = \begin{bmatrix} C_{11} & C_{12} \end{bmatrix} \begin{bmatrix} \hat{x}_k(t) \\ \hat{y}_k(t) \end{bmatrix}$$

where k is the track number;

t is a servo wedge number or time;

$u_k(t)$ is the control signals for positioning the transducer head, $x_k(t)$ is a state vector in a first dimension or time, $\hat{y}_k(t)$ is the stored track-following state variables, in a second dimension or track number, $\hat{y}_{k+1}(t)$ is the track-following state variables that are stored while generating the servo burst patterns, $e_k(t)$ is the position error signals (PES), and $A_{11}, A_{12}, A_{21}, A_{22}, B_{11}, B_{21}, C_{11}, C_{12}$ are matrices of appropriate dimensions.

24. Apparatus for defining tracks as defined in claim 19, wherein the compensator is defined by the following equations:

$$\begin{bmatrix} \hat{x}_k(t+1) \\ \hat{y}_{k+1}(t) \end{bmatrix} = \begin{bmatrix} A_g & 0 \\ C_g & 0 \end{bmatrix} \begin{bmatrix} \hat{x}_k(t) \\ \hat{y}_k(t) \end{bmatrix} + \begin{bmatrix} B_g \\ 0 \end{bmatrix} u_k(t) + K_e(e_k(t) - \hat{e}_k(t))$$

$$\hat{e}_k(t) = \begin{bmatrix} -C_g & 1 \end{bmatrix} \begin{bmatrix} \hat{x}_k(t) \\ \hat{y}_k(t) \end{bmatrix}$$

$$u_k(t) = K_c \begin{bmatrix} \hat{x}_k(t) \\ \hat{y}_k(t) \end{bmatrix}$$

where
- k is the track number;
- t is a servo wedge number or time;
- $e_k(t)$ is the position error signals (PES),
- $\hat{e}_k(t)$ is an estimate of the PES,
- $(A_g, B_g, C_g)$ is a state space description of a head disk assembly,
- $u_k(t)$ is the control signals for positioning the transducer head
- $x_k(t)$ is a state vector in the first dimension or time,
- $\hat{y}_k(t)$ is the stored track-following state variable, in a second dimension or time,
- $\hat{y}_{k+1}(t)$ is the track-following state variables that are stored while forming the servo burst patterns,
- $K_e$ is an estimator gain, and
- $K_c$ is a compensator gain.

* * * * *